United States Patent [19]
Hanly

[11] Patent Number: 4,554,859
[45] Date of Patent: Nov. 26, 1985

[54] BOW STROKE SIMULATOR

[76] Inventor: Leo D. V. Hanly, 30 Peebles Rd., Floreat Park, Western Australia, Australia

[21] Appl. No.: 609,565

[22] PCT Filed: Aug. 29, 1983

[86] PCT No.: PCT/AU83/00119
§ 371 Date: Apr. 27, 1984
§ 102(e) Date: Apr. 27, 1984

[87] PCT Pub. No.: WO84/01046
PCT Pub. Date: Mar. 15, 1984

[30] Foreign Application Priority Data
Oct. 5, 1982 [AU] Australia .................. PF5586

[51] Int. Cl.$^4$ .................................................. G10G 7/00
[52] U.S. Cl. .................................................. 84/283
[58] Field of Search .................... 84/281, 283, 465

[56] References Cited
U.S. PATENT DOCUMENTS
88,423 3/1869 Upson ............................ 84/274
2,239,579 4/1941 Solodar .......................... 84/283

FOREIGN PATENT DOCUMENTS
579869 10/1924 France ........................... 84/283
2039407A 8/1980 United Kingdom.

OTHER PUBLICATIONS
"Principles of Violin Playing and Teaching"–Ivan Galamian, Prentice-Hall, pp. 49, 58, 59 and 61.

Primary Examiner—Lawrence R. Franklin
Attorney, Agent, or Firm—Fleit, Jacobson, Cohn & Price

[57] ABSTRACT

A bow stroke simulator for stringed musical instruments to teach students correct bowing action. A tube is fixed to an instrument between the bridge and the fingerboard under the strings parallel to the bridge and a length of rod or dowel is positioned to slide in the tube to simulate the bow. The tube may be fixed to an instrument which simulates a stringed musical instrument.

6 Claims, 3 Drawing Figures

U.S. Patent   Nov. 26, 1985   4,554,859
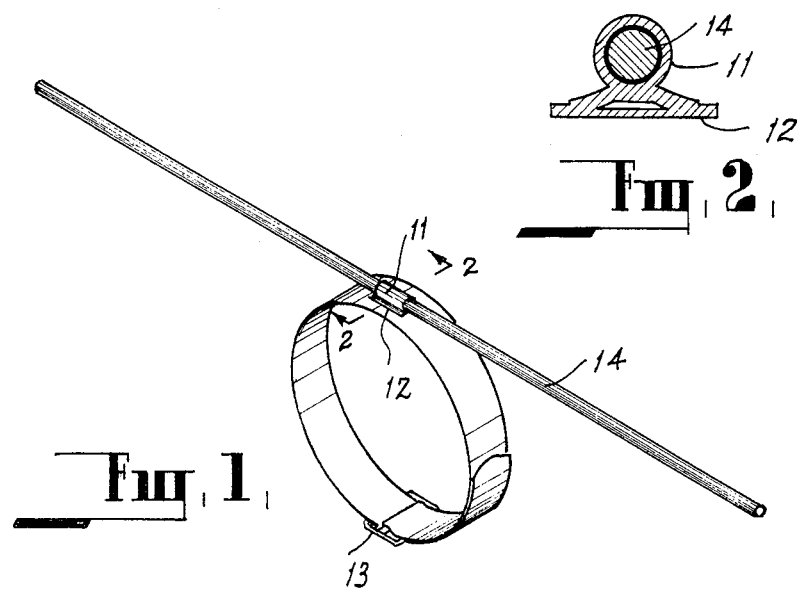
Fig. 2
Fig. 1
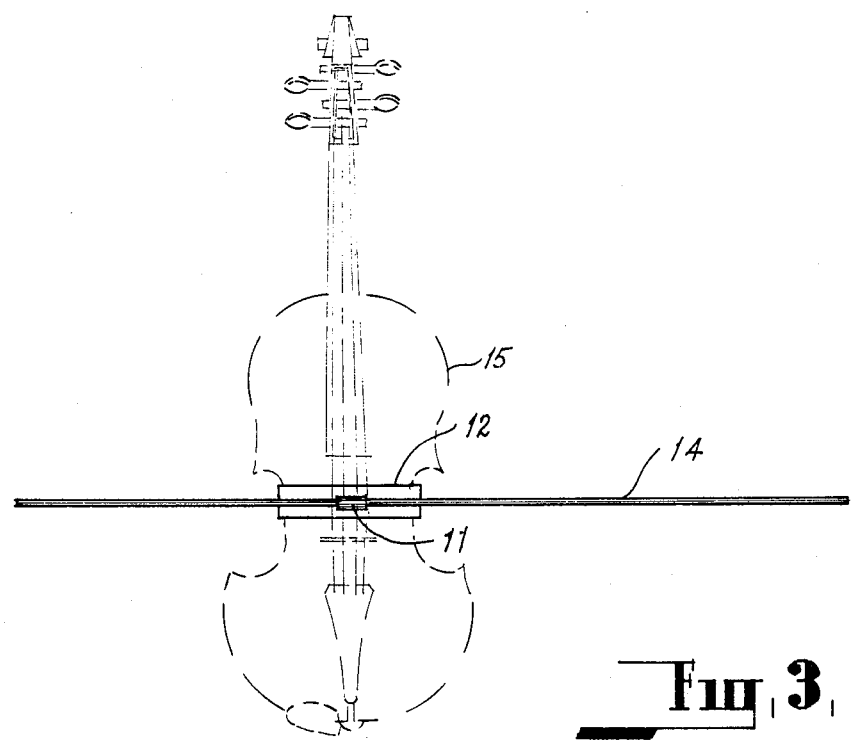
Fig. 3

BOW STROKE SIMULATOR

This invention relates to a bow stroke simulator for training students to use the correct bowing action on stringed musical instruments such as the violin, the viola and the violoncello.

The movement of the right arm in bowing a stringed instrument is a complex one which requires repeated practice before a student acquires the flexible and smooth movement needed for good tone production. Many beginners form incorrect habits whilst practising during the period between their regular lessons and in consequence progress is retarded. It is desirable that the bow move in a straight line parallel to the bridge of the instrument.

The object of this invention is to provide a bow stroke simulator which can be fitted to an instrument or a simulated instrument or incorporated therein to enable the student to learn the correct bowing action without any discordant noise which may be produced when the student practises with a normal bow on an actual instrument and reduces the need for constant supervision.

In one form the invention resides in a bow stroke simulator for a stringed musical instrument comprising a short length of tube and means for fastening the tube to the top plate of the musical instrument between the bridge and finger board below the strings with the axis of the tube parallel to the bridge, said tube being adapted to receive a length of rod or dowel simulating a bow for the instrument.

The diameter of the tube in relation to the diameter of the length of rod used as a simulated bow should be such that the rod has sufficient clearance to slide freely with a minimum of deviation from the longitudinal axis of the tube and thus maintain the simulated bow substantially parallel to the bridge of the instruments.

The invention will be better understood by reference to the following description of one specific embodiment thereof shown in the accompanying drawings wherein;
FIG. 1 is a perspective view;
FIG. 2 is a section on line 2—2 of FIG. 1; and
FIG. 3 is a plan view showing the simulator attached to a violin which is shown in broken lines.

As shown in the drawings the simulator comprises a short length of tube 11 which is formed integral with or welded to a strap 12 provided with a buckle or like fastening means 13. The diameter of the tube is such that a length of wooden rod or dowel 14 can slide freely therein and be used to simulate a bow. For the range of instruments used by the majority of students a rod or dowel of the order of 8 mm diameter and a tube of a diameter of the order of 9.2 mm is satisfactory.

The strap is positioned around the waist of the violin 15 as shown in FIG. 3 of the drawings, the strap passing under the strings and the buckle being located on the underside of the instrument. The stick, or rod 14 with one end held in the manner of bowing, is moved back and forth through the tube. Because the tube is not free to move the stick must remain substantially parallel to the bridge and the correct flexing of the student's wrist and elbow joint is induced. A straight line drawn along the length of the stick can also indicate to the student the extent of any alteration in the angle cause by lifting and/or dropping of the wrists during the simulated bow stroke.

Whilst the invention has been described with particular reference to one specific embodiment thereof it should be appreciated that other embodiments are possible, for example the tube 11 may be formed separate from the strap and may be fastened thereto by any suitable means such as a dovetail joint or a press stud type of arrangement. Alternatively, the strap may be replaced by clips to fit over the appropriate part of the instrument. A fastener of the type such as that marketed under the trade mark "Velcro" may be used in place of the buckle for fastening the strap in position.

In the case of very small violins the space between the top plate and the strings is very restricted, and in such cases it may be desirable to replace the violin by a simulated instrument constructed to represent a violin. In this case the tube is permanently fixed to the simulated instrument to act as a guide for the bow or simulated bow in the manner described above.

An advantage of securing the tube by means of the strap is that the device is more easily fitted to or removed from the instrument. Furthermore, the tube does not need to extend beyond the width of the instrument and can be confined to the space immediately below the strings. Because of this, the student is able to alternate between the bow stroke simulator and the use of the real bow on the strings without removing the apparatus.

The claims defining the invention are as follows:
1. A bow stroke simulator for a stringed musical instrument including a top plate supporting a finger board and a bridge, and strings interconnecting said bridge and said finger board and being spaced from said top plate, said bow stroke simulator comprising:
   a short length of tube; and
   fastening means for fastening the tube to the top plate of said stringed musical instrument between said bridge and said finger board and below said strings with the longitudinal axis of the tube extending parallel to the longitudinal axis of the bridge, said tube being adapted to slidably receive a length of rod simulating a bow for the instrument.
2. A bow stroke simulator as claimed in claim 1 wherein the diameter of the tube in relation to the diameter of the length of rod used as a simulated bow is such that the rod has sufficient clearance to slide freely within the tube with a minimum of deviation from the longitudinal axis of the tube to maintain the simulated bow substantially parallel to the longitudinal axis of the bridge of the instrument.
3. A bow stroke simulator as claimed in claim 1 wherein the fastening means comprises a strap fastened around the waist of the instrument, said tube being attached to the strap.
4. A stringed instrument bow stroke simulator comprising:
   a stringed instrument including a bridge and a fingerboard, and strings interconnecting said bridge and said fingerboard and being spaced from said stringed instrument,
   a short length of tube having a circular cross-section,
   fastening means for rigidly mounting the tube to the stringed instrument between the bridge and the fingerboard and below the strings with the axis of said tube extending parallel to the bridge, and
   a rod-like member having a circular cross-section with a diameter slightly less than the diameter of the tube, said rod-like member being rotatably and slidably received within said tube with a minimal deviation of the longitudinal axis of the rod-like member from the longitudinal axis of the tube being allowed during reciprocal motion of said rod-like member within said.

5. A stringed musical instrument bow stroke simulator as claimed in claim 4 wherein said fastening means comprises a strap to be attached to the waist of the instrument.

6. A stringed musical instrument bow stroke simulator as claimed at claim 4 wherein said rod-like member has a straight line located along its length.

* * * * *